United States Patent [19]

Schrenk

[11] Patent Number: 5,540,978
[45] Date of Patent: Jul. 30, 1996

[54] ALL-POLYMERIC ULTRAVIOLET LIGHT REFLECTING FILM

[75] Inventor: Walter J. Schrenk, Midland, Mich.

[73] Assignee: The Dow Chemical Compny, Midland, Mich.

[21] Appl. No.: 240,970

[22] Filed: May 11, 1994

Related U.S. Application Data

[63] Continuation of Ser. No. 842,275, Feb. 25, 1992, abandoned.

[51] Int. Cl.$^6$ .............................. B32B 7/02; B32B 27/00
[52] U.S. Cl. ........................ 428/212; 428/213; 428/332; 428/333; 428/339; 428/421; 428/422; 428/522; 359/586
[58] Field of Search .................................... 428/421, 522, 428/422, 212, 213, 332, 333, 339; 359/586

[56] References Cited

U.S. PATENT DOCUMENTS

| | | | |
|---|---|---|---|
| 3,711,176 | 1/1973 | Alfrey, Jr. et al. | 359/359 |
| 3,759,647 | 9/1973 | Schrenk et al. | 425/133.5 |
| 3,773,882 | 11/1973 | Schrenk | 264/173.12 |
| 3,884,606 | 5/1975 | Schrenk | 425/133.5 |
| 5,122,905 | 6/1992 | Wheatley et al. | 359/586 |
| 5,122,906 | 6/1992 | Wheatley | 359/586 |

OTHER PUBLICATIONS

J. Im et al, "Coextruded Microlayer Film and Sheet," Journal of Plastic Film & Sheeting, vol. 4—Apr. 1988.
"Shedding a New Light on Hazardous Waste," Solar Energy Research Institute Apr. 1990.
"Cleaning Up with the Sun," Solar Energy Research Institute, Mar. 1990.
"Solar Furnaces: Concentrating 100,000 Suns," Mechanical Engineering, Feb. 1991.
Jorgensen et al, "Ultraviolet Reflector Materials for Solar Detoxification of Hazardous Waste," Solar Energy Research Institute, Jul. 1991.
Anderson et al, "The Dept. of Energy's Solar Industrial Program: New Ideas for American Industry," Solar Energy Research Institute, Jul. 1991.
"Sunlight Destroys Wastes," Solar Energy Research Institute, Mar. 1991.
Link et al, "Cost and Performance Projections for Solar Water Detoxification Systems," Solar Energy Research Institute, ASME Int. Solar Energy Mg., Mar. 1991.
Anderson et al, "Development of U.S. Solar Detoxification Technology: An Introduction," Solar Energy Research Institute, Mar. 1990.

Primary Examiner—Leszek Kiliman

[57] ABSTRACT

An all-polymeric ultraviolet light reflective film which is lower in cost than previously used reflector materials, is weather resistant, and which does not absorb significant amounts of solar ultraviolet energy is provided. The film includes a sufficient number of alternating layers of at least first and second diverse polymeric materials which have an average percent transmission of greater than about 50% between wavelengths of 300–400 nm. A substantial majority of the individual layers of the film have optical thicknesses in the range where the sum of the optical thicknesses in a repeating unit of the polymeric materials is between about 0.15 μm to about 0.228 μm, and the first and second polymeric materials differ from each other in refractive index by at least about 0.03 in the wavelength range of from about 300–400 nm. The reflective film is useful as a reflective material in solar detoxification systems, as a protective material in indoor and outdoor lighting systems, as a UV mirror in the fields of medical imaging, astronomical telescopes, and microscopy or in chemical reactions using UV radiation.

12 Claims, 3 Drawing Sheets

ALL-POLYMERIC ULTRAVIOLET LIGHT REFLECTING FILM

This application is a continuation of an earlier application U.S. Ser. No. 07/842,275, filed Feb. 25, 1992, now abandoned.

BACKGROUND OF THE INVENTION

This invention relates to an all-polymeric ultraviolet reflecting film, and more particularly to a reflector which is substantially transparent to visible and near infrared wavelengths while reflecting a substantial portion of solar ultraviolet wavelengths.

A major problem exists in this and other countries because of the ever-increasing production of hazardous water-borne wastes as by-products of industry. Nearly 240 million tons of hazardous wastes are discharged each year in this country into sewers, streams, ponds, and rivers. Other hazardous wastes leach into ground water supplies from landfills or damaged underground storage tanks.

While some of the wastes can be contained at the source of their production, once the wastes materials enter large water sources, their concentration becomes diluted. Still, the level of concentration of the wastes pose health hazards to the general population. Because the volumes of water which must be decontaminated are so large and the concentrations of wastes so dilute, purification becomes an enormous undertaking.

One method of treating large volumes of dilute liquid hazardous wastes has been solar detoxification. Solar detoxification utilizes the energy of the sun, specifically the ultraviolet portion of the solar spectrum, to degrade organic hazardous wastes in water. Contaminated waste is treated using a combination of solar radiation and light-activated catalysts. A wide variety of organic pollutants can be broken down into carbon dioxide, water, and simple mineral acids which then can be easily neutralized using this process. Such wastes include pesticides, industrial solvents, preservatives, dyes, and hydrocarbon fuels.

Typically, a solar detoxification system includes a series of solar reflectors which reflect the sunlight onto clear glass tubes carrying the liquid waste stream. Catalyst is introduced into the tubes either by mixing with the waste stream or by fixing the catalyst onto a porous lattice-like structure in the tubes through which the waste stream flows. Ultraviolet light wavelengths of between 300 to 400 nm are needed for the catalytic degradation process to proceed. Thus, because only about 3–4% of the solar energy spectrum, is within this range, very efficient reflectors are required. Further, as excessive solar heating of the stream may be in many instances undesirable, such reflectors ideally are transparent to visible and near infrared wavelengths.

Because of the size of such reflectors and the need for solar exposure, materials for use in such reflectors need to have outdoor durability. Further, the reflectors should have specular reflectance characteristics and have a reflectance which is relatively insensitive to the angle of incidence of the sun's rays. Ultraviolet reflecting films have been fabricated from bare metals such as electropolished aluminum, coated films such as aluminum-coated polymer films, or multilayer metal oxide coatings. However, each of these classes of materials suffers from one or more deficiencies.

Polished metal surfaces are of questionable outdoor durability due to the formation of oxides thereon from the presence of moisture and air pollutants. Metal surfaces also reflect visible and solar infrared wavelengths and may cause unwanted heating in certain applications. While protective layers of materials may be applied, that increases manufacturing costs and may adversely affect the specular reflecting characteristics of the metal. Metallized polymer films have been developed for indoor lighting applications. However, such metal-coated polymers are not recommended for outdoor use. Multilayer metal oxide coatings require repetitive layer depositions using sputtering or chemical vapor deposition techniques. The costs to produce multilayer metal oxide films are presently prohibitive for the large surface areas needed for solar detoxification reflectors.

There is also a need for ultraviolet light reflecting films in other technologies. For example, UV mirrors are used in the fields of medical imaging, astronomical telescopes, microscopy, chemical reactions which use ultraviolet light as a curing mechanism, indoor lighting, microlithography, industrial micro-machining, and ultraviolet laser reflection. It would be desirable to be able to have low cost, highly UV reflective products for use in those technologies as well as in solar detoxification.

Reflective multilayer articles of polymers are known, as are methods and apparatuses for making such articles. For example, such multilayered articles may be prepared utilizing multilayer coextrusion devices as described in commonly-assigned U.S. Pat. Nos. 3,773,882 and 3,884,606 to Schrenk. Such devices are capable of simultaneously extruding diverse thermoplastic polymeric materials in substantially uniform layer thicknesses. The number of layers may be multiplied by the use of a device as described in commonly-assigned U.S. Pat. No. 3,759,647 to Schrenk et al.

Alfrey, Jr. et al, U.S. Pat. No. 3,711,176, teach a multilayered highly reflective thermoplastic body fabricated using optically thin film techniques. That is, the reflective optically thin film layers of Alfrey, Jr. et al relied on the constructive interference of light to produce reflected visible, ultraviolet, or infrared portions of the electromagnetic spectrum. Such reflective optically thin films have found use in decorative items because of the iridescent reflective qualities of the film. The patentees also describe an ultraviolet blocking film which is transparent to visible light used for protective packaging for foods.

Im and Schrenk, "Coextruded Microlayer Film and Sheet", *Journal of Plastic Film & Sheeting*, vol. 4, pp. 104–115 (April 1988), describe a multilayer ultraviolet reflecting film of polycarbonate and polypropylene used to block ultraviolet radiation from reaching packaged foods. However, like the Alfrey et al UV reflecting film, the film is designed to block ultraviolet radiation from reaching the foods packaged in the film, and the polymers utilized in fact absorb significant amounts of ultraviolet radiation.

Accordingly, the need still exists in the art for low cost, weather resistant, ultraviolet light reflecting (but non-ultraviolet absorbing) films which can be used for a variety of purposes. The need also exists for such materials additionally being substantially transparent to visible and infrared light.

SUMMARY OF THE INVENTION

The present invention meets that need by providing an all polymeric ultraviolet light reflective film which is lower in cost than previously used reflector materials, is weather resistant, and does not absorb significant amounts of solar ultraviolet energy. While a preferred use for the film of the present invention is as a reflective material in solar detoxification systems, the film also is useful in other applications where ultraviolet light reflectivity, but visible light transparency is required.

The terms "reflective", "reflectivity", "reflection", and "reflectance" as used herein refer to total reflectance (i.e., ratio of reflected wave energy to incident wave energy) of a sufficiently specular nature. The use of these terms is intended to encompass semi-specular or diffuse reflection as well. In general, reflectance measurement refers to reflectance of light rays into an emergent cone with a vertex angle of 15 degrees centered around the specular angle. By the term "diverse" we mean that the polymeric materials need not differ in any respect except in terms of refractive index. Thus, while adjacent layers may be chemically diverse, if such materials have the same refractive index, then for purposes of the present invention they are not "diverse".

A specific intensity of reflectance, when used herein, is the intensity of reflection which occurs at a wavelength where no substantial absorption occurs. For example, the films of the present invention are designed to reflect ultraviolet light having wavelengths in the range of from about 300–400 nm. Light of other wavelengths, such as in the visible range, pass through (i.e, are transmitted by) the films. It is at these ultraviolet wavelengths to which the intensity of reflection is referring.

According to one aspect of the present invention, an ultraviolet light reflective all-polymeric film of at least first and second diverse polymeric materials which do not absorb significant amounts of ultraviolet radiation is provided, the film comprising a sufficient number of alternating layers of the first and second polymeric materials such that at least 30% of ultraviolet light of a wavelength of between about 300–400 nm incident on the film is reflected. The individual polymeric materials used also maintain an average percent transmission of greater than about 50% between wavelengths of 300–400 nm. A substantial majority of the individual layers of the film have optical thicknesses in the range where the sum of the optical thicknesses in a repeating unit (such as AB for a two component film) are in the range of from about 0.15 µm to about 0.20 µm. In a preferred embodiment of the invention, for a two component ultraviolet reflecting film having a repeat unit AB, a substantial majority of the individual layers have an optical thickness of between about 0.07 µm to about 0.11 µm, and the first and second polymeric materials differ from each other in refractive index by at least about 0.03 in the wavelength range of from about 300–400 nm. Average percent transmission of the individual polymeric materials is defined as the sum of the percentages of light transmitted measured at 300 and 400 nm, respectively, divided by two.

Polymers useful in the practice of the present invention must possess a combination of unique properties. Generally, the individual polymers must be substantially transparent to visible light (about 400–800 nm), and preferably are also substantially transparent to wavelengths in the near infrared spectrum (about 800–2100 nm). The polymers must inherently be resistant to degradation by ultraviolet light without the addition of ultraviolet light absorbers. Additionally, the polymers must not absorb substantial amounts of ultraviolet radiation (i.e., have an average transmission of greater than about 50% between 300–400 nm) and must, when arranged as described herein, reflect substantial amounts (i.e., at least 30%) of solar ultraviolet radiation in the range of from about 300–400 nm. Suitable polymers for use in the practice of the present invention include those selected from the group consisting of polymethyl methacrylate, polyvinylidene fluoride, polychlorotrifluoroethylene, and polymethylpentene-1.

A preferred multilayer ultraviolet reflective film includes polyvinylidene fluoride as the first polymeric material and polymethyl methacrylate as the second polymeric material.

In certain embodiments of the invention, it is desirable to form the reflective polymeric film to comprise at least 200 or more layers. Increasing the number of layers in the polymeric film has been found to increase its reflectivity (i.e., the percentage of incident light reflected from the film). Thus, by controlling the number of layers, the degree of reflectivity of the article may be controlled. To increase the reflectance of the film, the number of layers may be increased to in excess of a thousand layers or more. Reflectance values of greater than 80% for the ultraviolet portion of the spectrum between about 300–400 nm are well within the scope of the invention. However, care must be taken that the overall thickness of the film does not become too great, as thicker films may absorb more light depending on polymer type. Total film thicknesses of between about 0.5 to 10.0 mils or greater are within the scope of the invention, with thicknesses of between about 1.0 to 5.0 mils being preferred.

To enable the film to be formed into a desired reflector shape, the multilayer polymeric film is most preferably laminated to or coextruded with a transparent substrate. Suitable transparent substrates include single sheets of those polymers useful in the practice of the present invention as well as glass. A thermoformable material or material which can be extruded into a desired reflector configuration is preferred.

In another embodiment of the invention, the polymeric film includes first, second, and third diverse polymeric materials of alternating layers in a repeating unit ABCB, and wherein a substantial majority of the individual layers of the first, second, and third polymeric materials have optical thicknesses in the range where the sum of the optical thicknesses in a repeat unit are in the range of between about 0.15 µm and 0.20 µm. Thus, for such a three component film having a repeat unit ABCB, optical thicknesses of individual layers of between about 0.025 µm to about 0.040 µm are preferred. For some three layer combinations, the B layer may not only contribute to the ultraviolet reflective properties of the film but may also act as an adhesive layer to bond the A and C layers in the multilayer film. It is not necessary that the refractive index mismatch of the B layer with the other two layers be at least about 0.03. For example, the refractive index of the polymer making up the B layer may be intermediate that of the A and C layers.

Other three layer repeating patterns are also possible. For example, an ABC repeating unit pattern may be used where the polymer making up the third polymer layer may be placed in the multilayer film as a moisture or oxygen barrier layer or toughening layer. When the third polymer layer is a barrier layer, it may be present as a single layer on one or both exterior surfaces of the film or as an interior layer. Again, such a third polymer must conform to the above-stated requirements for the other polymers in the multilayer film.

Also, the third polymer layer may be found as a surface or skin layer on one or both major exterior surfaces for an AB repeating unit pattern film or as an interior layer. The skin layer may be sacrificial, or may be permanent and serve as scratch resistant or weatherable protective layer. Further, such skin layers may be post applied to the film after coextrusion. For example, a skin layer may be applied as a sprayed on coating which would act to level the surface of the film to improve optical properties and impart scratch resistance, chemical resistance and/or weatherability. The skin layer may also be laminated to the multilayered film. Lamination is desirable for those polymers which are not readily coextrudable.

Accordingly, it is an object of the present invention to provide an all polymeric ultraviolet light reflective film which is lower in cost than previously used reflector materials, is weather resistant, and does not absorb significant amounts of solar ultraviolet energy. These, and other objects and advantages of the present invention will become apparent from the following detailed description, the accompanying drawings, and the appended claims.

DETAILED DESCRIPTION OF THE PREFERRED EMBODIMENTS

Figure 1:
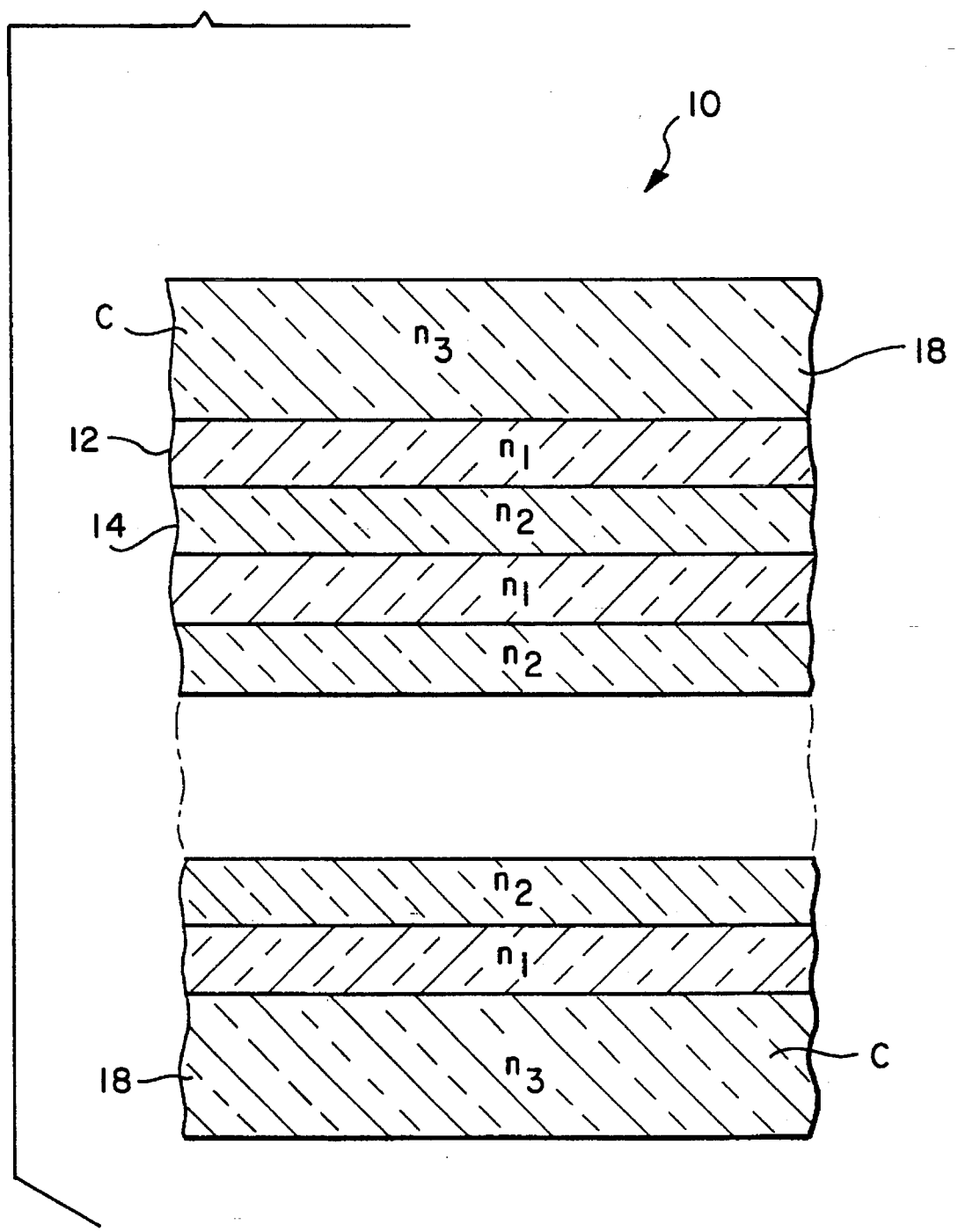
FIG. 1 is a schematic cross section of a two component multilayer ultraviolet reflecting film of the present invention, the film including protective skin layers on both exterior surfaces thereof.

The present invention provides improved multilayer all-polymeric ultraviolet reflecting films with a number of desirable properties including substantial ultraviolet reflectivity over the wavelength range of about 300–400 nm while not absorbing any substantial amounts of ultraviolet radiation, substantial transparency to visible and near infrared light, and the capability of being laminated to substrates to form a number of useful articles. The optical theory of multiple reflections from layers having differing refractive indices demonstrates the dependency of the effect on both individual layer thickness and refractive index of the material. See, Radford et al, "Reflectivity of Iridescent Coextruded Multilayered Plastic Films", Polymer Engineering and Science 13, 3, pg. 216 (1973). The primary or first order reflected wavelength for a two component multilayer film for normal incidence is given by the equation below.

$$\lambda_1 = 2(n_1 d_1 + n_2 d_2)$$

where, $\lambda_1$ is the wavelength of first order reflection in nanometers, and spans the range of 300–400 nm, $n_1$ and $n_2$ are the refractive indices of the two polymers, and $d_1$ and $d_2$ are the layer thicknesses of the two polymers, also in nanometers.

For a three or more component film, the above equation may be generalized to:

$$\lambda_1 = 2 \sum_{i=1}^{m} n_i d_i$$

where $\lambda_1$, n, and d are as defined above and m is an integer greater than 1. Thus, for example, for a three component film having a polymer repeating unit of ABCB, the equation is:

$$\lambda_1 = 2(n_A d_A + n_B d_B + n_C d_C + n_B d_B)$$

If $d_A = d_B = d_C$, then the sum of the optical thicknesses in a repeat unit varies within the range of from about 0.15 μm to about 0.20 μm. Preferably, the optical thickness range for each individual layer in the ABCB repeating unit to span 300–400 nm is from about 0.025 μm to about 0.036 μm.

As can be seen, the first order reflected wavelength is proportional to the sum of the optical thicknesses of the two polymers (where optical thickness, $n_i d_i$, is the product of layer thickness times refractive index). In addition to first order reflections, higher order reflections occur at integer fractions of the first order. The relative intensity of these higher order reflections depends on the ratio of the optical thickness of the polymer components.

To produce a film which reflects a broad bandwidth of wavelengths in the range of from about 300–400 nm, a layer 10 thickness gradient may be introduced across the thickness of the film. Thus, in one embodiment of the invention, the layer thicknesses will increase monotonically across the thickness of the film. By monotonically, it is meant that the layer thicknesses increase at a predetermined rate across the thickness of the film. See, Schrenk, U.S. Pat. No. 3,687,589. As can be seen from the above equations, variations in individual layer thickness, d, have a direct effect on the optical properties of the film.

The layer optical thicknesses needed for reflecting in the 300–400 nm range described above have all been described for reflectance of light at normal incidence (i.e., 0°) on the film. The reflected wavelength varies with the angle of incidence of the solar energy. As the angle of incidence varies from 0° (normal incidence) to 45°, the shift is about 55 nm.

To accommodate the wavelength shift and the probability that not all light will strike the ultraviolet reflecting film at normal incidence, the layer optical thicknesses in the film may be designed to accommodate this somewhat larger range of 300 nm to 455 nm. While the film would reflect some visible light at normal incidence, it would be better able to reflect ultraviolet light at a range of angles of incidence. The maximum optical thicknesses of the layers in this design would increase about 15%, so that the sum of optical thicknesses in a repeating unit are in the range of from about 0.15 μm to about 0.228 μm. Such a design would insure that substantially all ultraviolet light impinging upon the film was reflected, even if the light were incident at an angle other than normal to the film.

FIG. 1 schematically illustrates a two-component ultraviolet reflective film 10 having a repeating unit AB in accordance with the present invention. The film 10 includes alternating layers of first polymer 12 having a refractive index, $n_1$, and a second polymer 14 having a refractive index, $n_2$. FIG. 1 shows a preferred form of the invention where substantially all of the layers of the film have optical thicknesses where the sum of the optical thicknesses of the repeat unit varies between about 0.15 μm to about 0.20 μm. Preferably, each individual layer has an optical thickness of between about 0.07 μm and 0.11 μm. FIG. 1 also depicts skin layers of a polymer (C) 18 positioned on both major exterior surfaces of the reflective body to protect the other layers from scratches or weathering or to provide support for the other layers.

Preferably, the polymers chosen have a refractive index mismatch of at least 0.03 at the wavelengths 300–400 nm. Typically, refractive indices of materials, including polymers, are measured at a convenient wavelength in the visible range such as 589 nm sodium vapor. It is known that refractive indices of polymers can increase at shorter wavelengths. However, it is difficult to measure refractive indices at ultraviolet wavelengths. We have found, however, that the refractive index mismatch of two diverse polymers, chosen based on published refractive indices at visible wavelengths, remains at least as large at ultraviolet wavelengths. Accordingly, choosing a refractive index mismatch of at least 0.03 will be a conservative estimate of the actual mismatch which occurs at ultraviolet wavelengths.

Preferably, for a three or more component system, the polymeric material having the highest refractive index differs from the polymeric material with the lowest refractive index by at least about 0.03. The refractive indices of other components may be intermediate that of the components having the highest and lowest refractive index.

The polymeric materials utilized in the practice of the present invention are unique in the combination of properties that they must possess. The polymeric materials do not absorb any substantial amounts of ultraviolet radiation and inherently resist degradation by ultraviolet light without the addition of ultraviolet light absorbers. By this it is meant that the polymeric materials used in the practice of the present invention maintain an average percent transmission of greater than about 50% between 300–400 nm. As solar ultraviolet makes up only about 3–4% of the total energy from the sun, absorption of significant amounts of the ultraviolet portion of the spectrum by a polymer severely detracts from its ability to find use in the present invention.

Generally, the individual polymers must be also substantially transparent to visible light, and preferably are also substantially transparent to wavelengths in the near infrared spectrum. As discussed above, the polymers must be resistant to degradation by ultraviolet light. Many thermoplastic polymers such as polystyrene and polyvinyl chloride are not resistant to degradation by ultraviolet radiation and must have incorporated therein UV absorbing compounds to improve stability. However, UV absorbing stabilizers will not function in the context of the present invention where non-absorption of ultraviolet radiation is a requirement.

Polymeric materials useful in the present invention include polymethyl methacrylate such as Cyro H15-012 (trademark) available from Cyro Industries (refractive index=1.49), polyvinylidene fluoride such as Kynar (trademark) available from Atochem North America, Inc.(refractive index=1.42), polychlorotrifluoroethylene such as Aclar 22A (trademark) available from Allied Signal Corporation (refractive index=1.41), and polymethylpentene-1 such as TPX (trademark) available from Mitsui Chemicals (refractive index=1.46). A preferred multilayer ultraviolet reflective film includes polyvinylidene fluoride as the first polymeric material and polymethyl methacrylate as the second polymeric material. Both polyvinylidene fluoride and polymethyl methacrylate have excellent stability and resistance to degradation in ultraviolet light as well as being nonabsorbers of ultraviolet light. In a preferred form, the reflective film includes relatively thick protective skin layers of polyvinylidene fluoride on each exterior surface and optically active alternating layers of polyvinylidene fluoride and polymethyl methacrylate in the interior.

It is preferred that the polymers selected have compatible rheologies for coextrusion. That is, as a preferred method of forming the multilayer films is the use of coextrusion techniques, the melt viscosities of the polymers must be reasonably matched to prevent layer instability or nonuniformity. The polymers used also should have sufficient interfacial adhesion so that the films will not delaminate. Alternatively, a third polymer may be used as an adhesive or glue layer to secure the first and second polymer layers together.

The multilayer ultraviolet reflective films of the present invention possess major advantages over prior art processes which use expensive metal and dielectric or chemical vapor deposition techniques. The films of the present invention can be tailored to reflect ultraviolet light over the 300–400 nm bandwidth; they can be readily coextruded and can have large surface areas; and they can be laminated to substrates which are shaped in a variety of useful articles such as a parabolic reflector.

Multilayer films in accordance with the present invention are most advantageously prepared by employing a multilayered coextrusion device as described in U.S. Pat. Nos. 3,773,882 and 3,884,606 the disclosures of which are incorporated herein by reference. Such a device provides a method for preparing multilayered, simultaneously extruded thermoplastic materials, each of which are of a substantially uniform layer thickness. Preferably, a series of layer multiplying means as are described in U.S. Pat. No. 3,759,647 the disclosure of which is incorporated herein by reference may be employed.

The feedblock of the coextrusion device receives streams of the diverse thermoplastic polymeric materials from a source such as a heat plastifying extruder. The streams of resinous materials are passed to a mechanical manipulating section within the feedblock. This section serves to rearrange the original streams into a multilayered stream having the number of layers desired in the final film. Optionally, this multilayered stream may be subsequently passed through a series of layer multiplying means in order to further increase the number of layers in the final film.

The multilayered stream is then passed into an extrusion die which is so constructed and arranged that streamlined flow is maintained therein. Such an extrusion device is described in U.S. Pat. No. 3,557,265, the disclosure of which is incorporated by reference herein. The resultant product is extruded to form a multilayered film in which each layer is generally parallel to the major surface of adjacent layers.

The configuration of the extrusion die can vary and can be such as to reduce the thickness and dimensions of each of the layers. The precise degree of reduction in thickness of the layers delivered from the mechanical orienting section, the configuration of the die, and the amount of mechanical working of the film after extrusion are all factors which affect the thickness of the individual layers in the final film.

Figure 2:
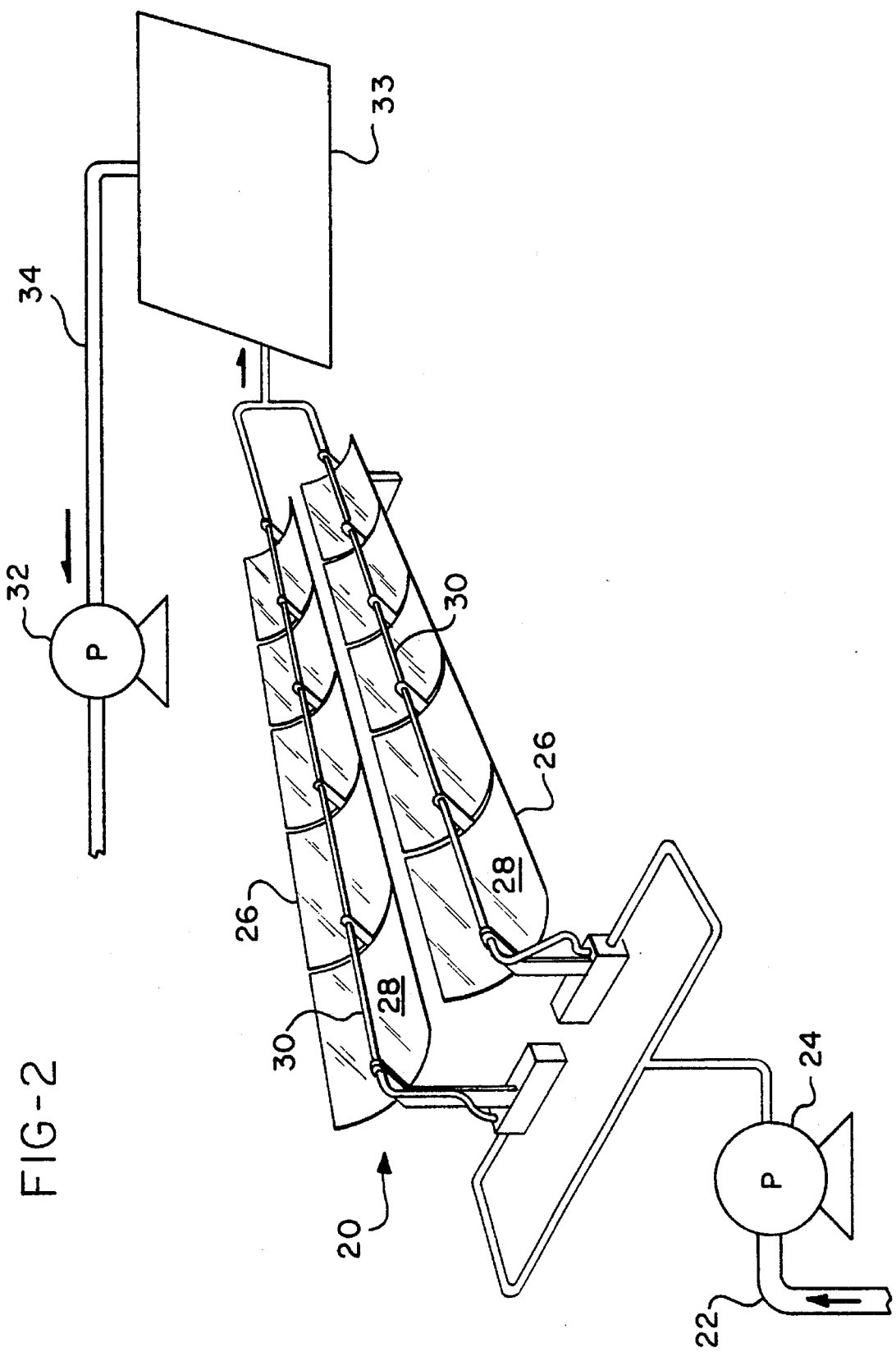
FIG. 2 is a perspective and somewhat schematic representation of a solar detoxification reflector system.

The ultraviolet reflective films of the present invention find a number of uses. As a primary example, they may be used as reflectors in a solar detoxification system. Such a system 20 is depicted schematically in FIG. 2. As shown, groundwater containing organic contaminants is pumped through line 22 by pump 24 to a series of solar reflector arrays 26. While only two such arrays are shown for simplicity, it will be understood that multiple arrays may be arranged in series or parallel to treat large quantities of contaminated water.

The reflector arrays 26 include parabolic-shaped solar ultraviolet reflecting film 28 laminated to a transparent substrate which reflects the ultraviolet portion of the sun's energy back toward transparent tubing 30 through which the contaminated liquid flows. As previously explained, a catalyst, such as titanium dioxide, may either be mixed with the flowing liquid stream or mounted on a porous matrix within the tubing 30. The remainder of the solar energy (i.e., wavelengths between about 400–2100 nm) passes through reflecting film 28, including preferably both the visible and near infrared portions of the spectrum. This prevents undue heating of the liquid stream which would otherwise occur if all of the solar energy was concentrated on the tubing. Alternatively, the visible and infrared solar energy transmitted through the reflector arrays may be collected or concentrated separately for other processes requiring solar heating.

However, in some instances, it may be desirable to provide some heating to the liquid to enhance a particular catalyzed degradation reaction. In those instances, the reflecting film of the present invention may be designed to reflect some or all of the solar visible and/or infrared energy. This may be accomplished by laminating the all polymeric ultraviolet reflective film of the present invention to a broadband visible and near infrared (400–2100 nm) all polymeric reflecting film as taught in commonly assigned, copending U.S. applications Ser. Nos. 466,168 filed Jan. 17, 1990, now U.S. Pat. No. 5,122,906 issued Jun. 16, 1992, and entitled "Thick/Very Thin Multilayer Reflective Polymeric Body" and 463,645, filed Jan. 11, 1990 now U.S. Pat. No. 5,122,905, issued Jun. 16, 1992 and entitled "Reflective Polymeric Body".

Alternatively, a sufficient number of layers having optical thicknesses in the range needed to reflect the desired amount of visible and/or infrared energy may be coextruded with the ultraviolet reflecting layers. As taught in the above-referenced applications, such layers may be optically thick (>0.45 μm) or a combination of optically thick and optically very thin (<0.09 μm), with a portion of the layers being optically thin (<0.09 μm and <0.45 μm), where optical thickness is defined as the product of actual layer thickness and refractive index of the polymer making up the layer.

After catalytic treatment and exposure to the solar ultraviolet energy, the treated liquid may be sent, for example, to a holding basin 33. From there, it may be pumped, via pump 32 and line 34, either back underground or to a commercial or industrial plant for use.

Other uses of the ultraviolet reflecting film of the present invention include UV mirrors which are used in the fields of medical imaging, astronomical telescopes, and microscopy. Chemical reactions also use ultraviolet light as a curing mechanism. The reflecting film of the present invention may be used to reflect or concentrate such radiation onto chemical reactants. Ultraviolet radiation is also used as a tool for sterilization. The UV reflective films of the present invention may find use in directing ultraviolet radiation onto articles to be sterilized. Other outdoor uses for the films of the present invention include laminating the film to windows or skylights to protect interior furnishings from the degradative effects of ultraviolet light. For example, the ultraviolet reflecting films of the present invention could be laminated to or included in automotive window glass to protect the interior upholstery and dashboard.

There is also a need for ultraviolet reflective films in indoor lighting to protect persons, foods, clothing or furniture from the harmful, degradative effects of ultraviolet light. The reflective films of the present invention could be fabricated into protective tubes around fluorescent light sources. As the film is transparent to visible light, no loss of visible light would occur. Rather, only the undesired ultraviolet radiation would be contained. Ultraviolet light is known to be harmful to the human eye. The UV reflective film of the present invention may find use in sunglasses or welders' goggles. The film could be used in umbrellas to prevent ultraviolet radiation from reaching the skin of a person. Further, the film could be used to block UV light from reaching and causing fading and degradation to clothing and furniture. Microlithography, industrial micro-machining, and ultraviolet laser reflection are other fields in which the ultraviolet reflecting films of the present invention may find use.

In order that the invention may be more readily understood, reference is made to the following examples, which are intended to be illustrative of the invention, but are not intended to be limiting in scope.

EXAMPLE 1

To demonstrate the ultraviolet reflecting capabilities of the film of the present invention, a computer simulation was run to predict the reflectance characteristics of a two-component polymethyl methacrylate/polyvinylidene fluoride multilayer film. The simulation used a software program entitled "Macleod Thin Film Optics" available from Kidger Optics, Sussex, England. The sum of the optical thicknesses of the layers in the AB repeat unit of the film were assumed to be in the range of from 0.15 μm to 0.20 μm, and the individual layers were assumed to have optical thicknesses in the range of 0.07 μm to 0.11 μm. A refractive index mismatch of 0.07 was assumed based on the actual mismatch of the two polymers when measured at visible wavelengths.

Figure 3:
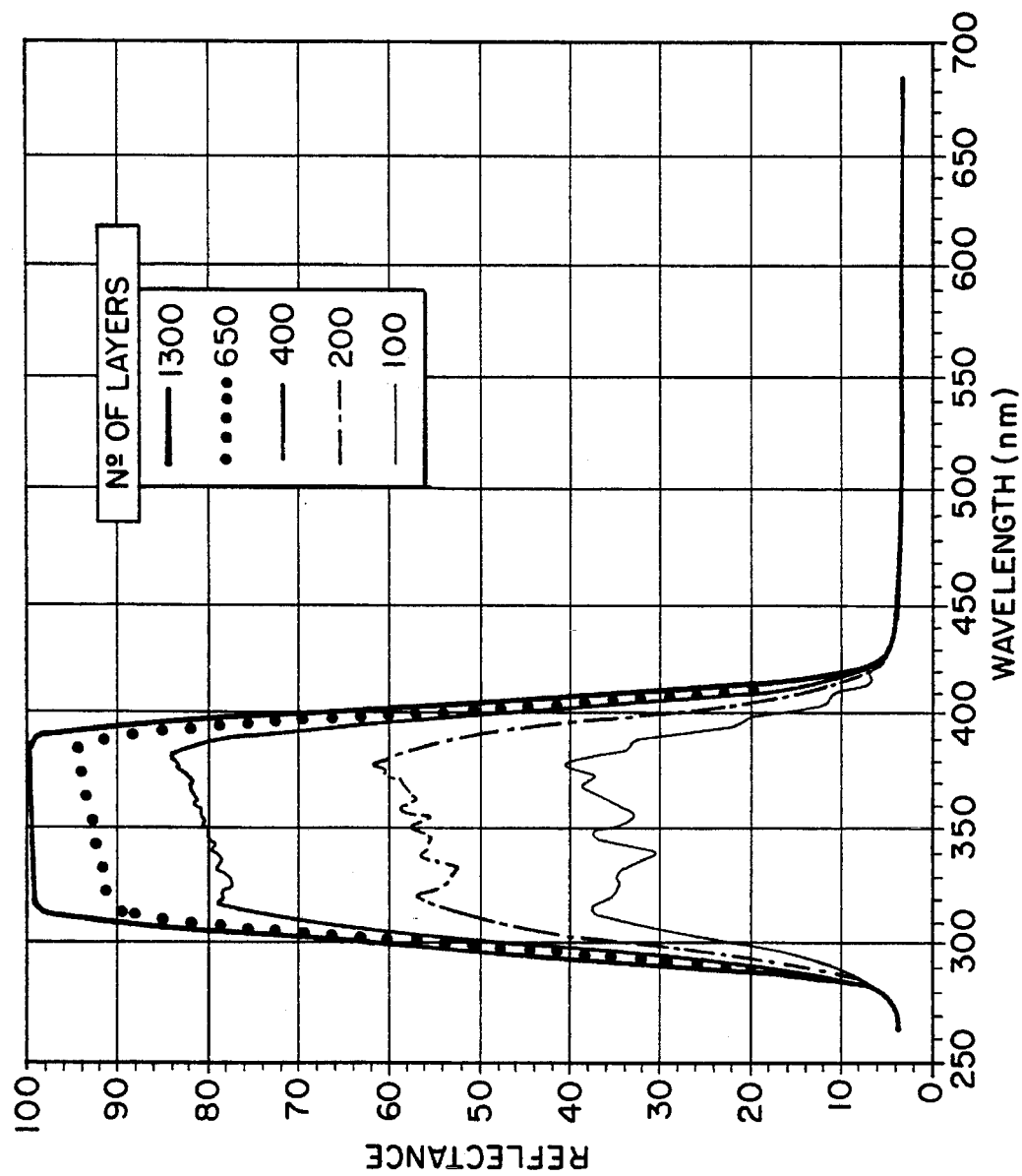
FIG. 3 is a graph of wavelength versus predicted reflectance for multilayer films fabricated in accordance with the present invention.

FIG. 3 depicts the predicted reflectance results for films having 100, 200, 400, 650, and 1300 alternating layers, respectively. As can be seen, as the number of layers in the multilayer film increases, the predicted reflectance of the film approaches 100% reflectance in the wavelength range of 300–400 nm. This demonstrates the strong ultraviolet light reflecting capabilities of the multilayer films of the present invention.

While certain representative embodiments and details have been shown for purposes of illustrating the invention, it will be apparent to those skilled in the art that various changes in the methods and apparatus disclosed herein may be made without departing from the scope of the invention, which is defined in the appended claims.

What is claimed is:

1. An ultraviolet light reflective all-polymeric film of at least first and second diverse polymeric materials which do not absorb significant amounts of ultraviolet radiation, said at least first and second polymeric materials are selected from the group consisting of polymethyl methacrylate, polyvinylidene fluoride, polychlorotrifluoroethylene, and polymethylpentene-1, the film comprising a sufficient number of alternating layers of at least said first and second polymeric materials which form predetermined repeating units such that at least 30% of ultraviolet light of a wavelength of between about 300–400 nm incident on said film is reflected, said first and second polymeric materials having an average percent transmission of greater then about 50% between wavelengths of 300–400 nm, a substantial majority of the individual layers of said film having optical thicknesses in the range where the sum of the optical thicknesses in one of said repeating units of said polymeric materials is between about 0.15 μm to about 0.228 μm, and wherein said first and second polymeric materials differ from each other in refractive index by at least about 0.03 in the wavelength range of from about 300–400 nm.

2. The ultraviolet light reflective polymeric film of claim 1 in which said individual layers have optical thicknesses of between about 0.07 μm to about 0.11 μm.

3. The ultraviolet light reflective polymeric film of claim 1 in which said first polymeric material is polyvinylidene fluoride and said second polymeric material is polymethyl methacrylate.

4. The ultraviolet light reflective polymeric film of claim 1 in which said polymeric film is laminated to or coextruded with an infrared light reflecting body.

5. The ultraviolet light reflective polymeric film of claim 1 in which said film comprises at least 200 layers.

6. The ultraviolet light reflective polymeric film of claim 1 in which at least 80% of ultraviolet light of a wavelength of between about 300–400 nm incident on said film is reflected.

7. The ultraviolet light reflective polymeric film of claim 1 in which said polymeric film includes first, second, and third diverse polymeric materials of alternating layers in a repeating unit ABCB.

8. The ultraviolet light reflective polymeric film of claim 1 in which said polymeric film includes first, second, and third diverse polymeric materials of alternating layers in a repeating unit ABC.

9. The ultraviolet light reflective polymeric film of claim 1 in which said polymeric film is laminated or coextruded with a transparent substrate material.

10. The ultraviolet light reflective polymeric film of claim 1 in which said polymeric film is laminated to or coextruded with a visible light reflecting body.

11. The ultraviolet light reflective polymeric film of claim 1 in which the film includes protective skin layers on both major exterior surfaces of said film.

12. The ultraviolet light reflective polymeric film of claim 11 in which said protective skin layers comprise polyvinylidene fluoride.

* * * * *